Figure 3:
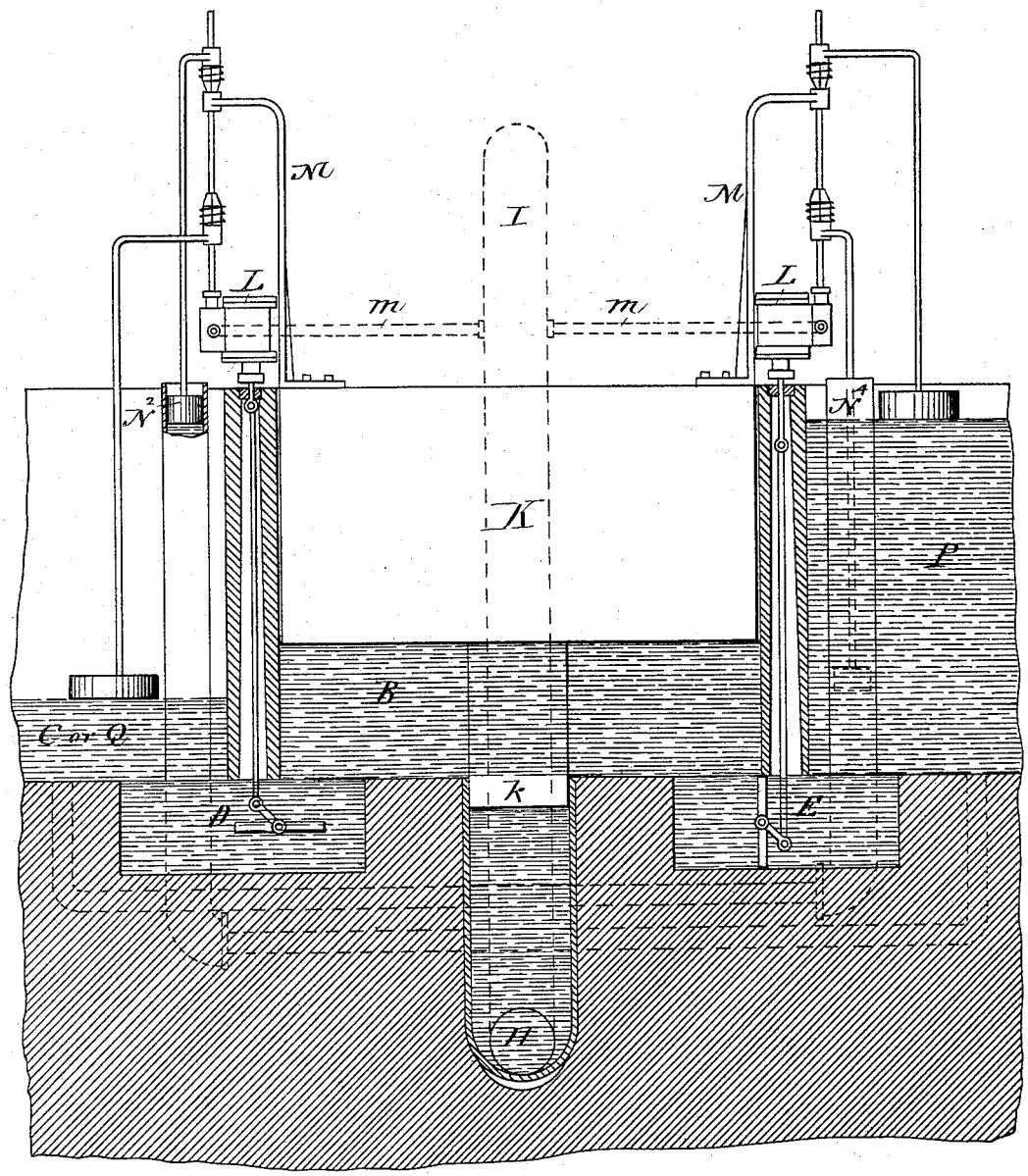

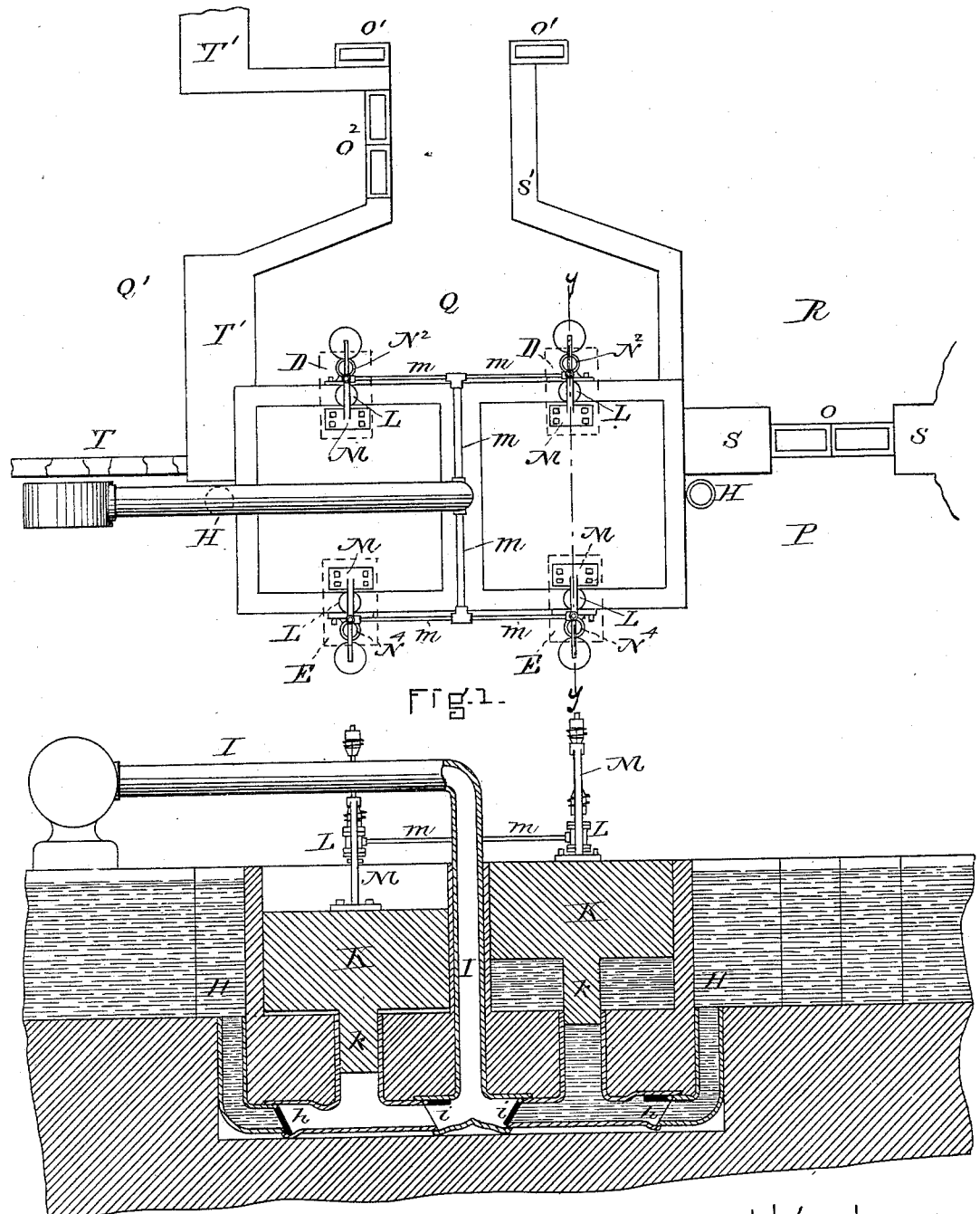

UNITED STATES PATENT OFFICE.

JOHN H. HAGERTY, OF LOWELL, MASSACHUSETTS.

SUPPLY OF WATER TO WATER-MOTORS.

SPECIFICATION forming part of Letters Patent No. 398,779, dated February 26, 1889.

Original application filed January 16, 1888, Serial No. 260,850. Divided and this application filed April 19, 1888. Serial No. 271,129. (No model.)

*To all whom it may concern:*

Be it known that I, JOHN H. HAGERTY, of Lowell, in the county of Middlesex and State of Massachusetts, a citizen of the United States, have invented a new and useful Improvement for the Supply of Water to Water-Motors, of which the following is a specification.

This invention relates to the manner of arranging the water-motor described in Letters Patent No. 344,960, of July 6, 1886, and the motor described in the pending application for water-motors filed January 16, 1888, Serial No. 260,850, and is a subdivision required by the examiner of the Patent Office in charge of the last-named application from the said application.

In the drawings, Figure 1 is a duplicate of the drawing Fig. 5 in said last-named application, and Fig. 2 is a duplicate of the drawing Fig. 4 in said last-named application, and Fig. 3 is a duplicate of the drawing Fig. 1 of the said last-named application. Fig. 1 is a plan of a pair of motors and their connections and surroundings desirable in case of working with tide-water or water liable to have variable levels; and Fig. 2 is a section of such an arrangement, taken vertically on an imaginary line connecting the centers of the pipes H H′ of Fig. 1. Fig. 3 is a central vertical section transverse to the section given in Fig. 2.

In the drawings, R is the tide area, in which the tide or other source of water-supply rises and falls.

S is a dam separating said tide area from a pond, P, into which water from the tide area R may be introduced, as desired.

O are the gates through which water is introduced from R to the pond P.

S′ is a dam which separates the pond Q from the tide area R, and O′ are gates through which water from said pond Q may be delivered into the said tide area R.

T is a dam which separates the pond P from the drainage area Q′, and T′ is a dam which separates the said drainage area Q′ from the pond Q, and also from the tide area R.

$O^2$ is a gate through which water from the pond Q′ can be delivered into the pond Q or taken from the pond Q and delivered to the drainage area Q′. The water-motor is described by detail in the specification from which this application is subdivided, and its construction is shown in Fig. 3. Its details are not claimed herein.

H is the induction-pipe, by which water is received from the pond P, and I is the eduction-pipe, by which the water which is to be pumped is delivered to its place of utilization.

$h$ are the valves which govern the inlet-passages H, and $i$ are the valves which govern the eduction-passages I.

K is the float, under which the water used as a source of power acts, and $k$ is the plunger, which acts upon the water that is to be delivered through the eduction-passage I.

L is the water-engine, which works the valves which furnish water to the float K.

$N^2$ and $N^4$ are the float-cylinders, in which the floats which govern the working of the valves of the water-engine L move.

M and M′ are the goose-necks connected with the float K, which serve to govern the action of the valves of the motor.

$m$ is the pipe which conveys water from the force main I to the water-engines L. Now, if R be the space occupied by tide-water, and P the pond from which the water that passes through the machine is to be drawn, and Q the pond into which the water which drives the machine is delivered, and Q′ be the drainage area, let us suppose that we begin to work at high tide with the drainage area Q′ empty. The gates O will have been closed to retain the water in the pond P, and the gates O′ will have been closed to keep the water in the tide area R from backing up against the machine and the gates $O^2$ will have been opened to allow the water that passes through the machine to flow away. Water is now admitted through the induction-pipes E, Fig. 3, to the machine, and it is discharged, after doing its work in the machine, into the pond Q, which communicates through the gates $O^2$ with the drainage area Q′, and the machine will continue to work until the water in pond P has been reduced and the water in the drainage area Q′ has been raised, so that the two are nearly at the same level. However, before this time the tide-water at R would, if the pond P and the drainage area Q′ are properly proportioned to each other, fall sufficiently to leave some head to the pond P over the height of water at R, and also the height of water at R would at that time be somewhat lower than the height of water in the drainage area Q'. In this case the gates O' would be opened and the gates O² be left open; but if the height of water at Q' did not predominate over the height of water at R the gates O² would be closed until there was a head of water in Q'. The machine, therefore, would continue to work until the height of water in pond P and that of the water at R became nearly equal. As the water in R would then be rising, the gates O' would be shut and the gates O would be opened, in order to fill up the pond and get a head of water in that pond superior to that in the drainage area Q', when the operation could begin again, until the height of water in pond P and in the tide area R were equal and the water had begun to fall at R, when the gates O would be closed.

In order to show the manner in which water is admitted beneath the float K, a drawing, Fig. 3, is made, which is the same as the drawing, Fig. 1, in the former application, in which the induction-passages to the float are shown at E and the eduction-passages from the float-chamber at D, the float-chamber itself being lettered B, and the drainage area, corresponding to the pond Q, lettered C. In this application the combination of gates and dams with the reciprocating motor are the only thing claimed, the construction of the motor forming the subject of the application filed January 16, 1888, Serial No. 260,850.

I am aware that there has been patented to Newhouse, April 7, 1877, No. 189,643, a system of two ponds, a dam separating the two ponds from a tide area and a cross-dam separating the two ponds from each other, in which cross-dam is placed an undershot or breast wheel to utilize the power as it flows from one pond to the other; and I am also aware that a somewhat similar arrangement of dams and ponds was patented to Mallory March 14, 1876, No. 174,692, in which there were two ponds separated from each other by a dam and separated from the tide area by another dam. In a hollow in the cross-dam which separates the two ponds is placed a shaft, on which are mounted two series of screw-propellers inclined in opposite directions. The water admitted from the tide-area enters one pond only and is discharged from the other pond, which it reaches after passing the propellers and their shaft. Neither of these two patents shows my invention. In my invention there is an opportunity to deliver the water which passes through the machine directly into the tide area at low tide and at the same time to be draining the drainage area or waste-pond Q' without sending any of the water which passes through the motor through it. I believe that this arrangement of the supply-pond P, the waste-pond Q', and the intermediate pond, Q, gives a better control to the machine and enables it to be worked longer and with a somewhat better fall than in the devices shown and described in the two patents referred to.

I claim as my invention and desire to secure by Letters Patent—

1. The combination of a water-motor with a water-supply area, R, in which the water is of variable height by means of the supply-pond P, the waste-pond or drainage area Q', the intermediate discharge-pond, Q, the dams S S' T T', and gates O O' O², substantially as described.

2. The combination of the supply-pond P and the drainage area Q' with a water area in which the water is of variable height by means of the dam S and gate O and dam T and the interposed water-motor and waste-pond Q, said waste-pond Q being separated from the water area R by the dam S' and from the drainage area Q' by the dam T', and connected at will with said water area R by the gates O' and with the drainage area Q' by the gate O², all in combination with each other, substantially as and for the purpose described.

JOHN H. HAGERTY.

Witnesses:
THOS. WM. CLARKE,
J. M. DOLAN.